United States Patent [19]

Gunther

[11] Patent Number: 4,596,504
[45] Date of Patent: Jun. 24, 1986

[54] SLIP ON RECEPTACLE FOR SELF LOCKING FASTENER

[75] Inventor: Conrad J. Gunther, Uniondale, N.Y.

[73] Assignee: Dzus Fastener Co., Inc., West Islip, N.Y.

[21] Appl. No.: 587,238

[22] Filed: Mar. 7, 1984

[51] Int. Cl.⁴ .............................................. F16B 21/00
[52] U.S. Cl. ...................... 411/555; 24/573; 24/590; 24/663; 24/664
[58] Field of Search ............... 411/555, 347, 349, 554, 411/105, 516, 549, 520, 172, 173, 174, 175; 24/663, 664, 662, 590, 591, 593, 594, 596, 573, 592

[56] References Cited

U.S. PATENT DOCUMENTS

| | | | |
|---|---|---|---|
| 1,519,765 | 12/1924 | Crone | 411/520 X |
| 2,443,309 | 6/1948 | Dzus | 411/555 |
| 2,798,271 | 7/1957 | Flora | 24/573 X |
| 3,417,441 | 12/1968 | Smith | 411/555 |
| 3,874,041 | 4/1975 | Smith | 411/555 |
| 3,975,804 | 8/1976 | Schenk | 411/555 |
| 4,188,688 | 2/1980 | d'Orgelys | 24/590 X |
| 4,308,646 | 1/1982 | Schenk | 411/554 |
| 4,378,615 | 4/1983 | Gunther | 411/555 |

FOREIGN PATENT DOCUMENTS 916737 8/1946 France ........................ 411/347

Primary Examiner—Kenneth J. Dorner
Assistant Examiner—Adrian H. Whitcomb, Jr.
Attorney, Agent, or Firm—Kane, Dalsimer, Kane Sullivan & Kurucz

[57] ABSTRACT

A quick acting, self locking fastener of the spiral cam type is provided with a receptacle comprising a housing having a bottom, open top and a pair of opposed sidewalls. One of the walls is provided with a lip at the top thereof and the opposed wall is provided with a slot at its top. The closure for the housing includes a pair of biased faces which define a clip therebetween. The bottom face is provided with a slot at one end and a lip at the opposite end. A spring within the housing includes a central section that forms a cross pin for an associated stud and end sections that serve to bias the opposed sidewalls apart to secure the engagement of the sidewall's lip and slot with those of the bottom face of the closure.

8 Claims, 5 Drawing Figures

SLIP ON RECEPTACLE FOR SELF LOCKING FASTENER

BACKGROUND OF THE INVENTION

The present invention relates to quick acting, self locking fasteners of the spiral cam type and in particular to an improved slip on receptacle for such fasteners.

A common type of fastener employs a stud having a spiral slot therein. The stud is designed to coact with a cam follower that engages and then gets caught up in the spiral cam slot. The follower is often contained in a receptacle which also contains a spring that permits the follower to follow the cam slot along the surface of the stud and in turn to provide a locking force for two members when the stud is coupled to one member and the receptacle is coupled to the other member. With fasteners of this type the stud is coupled to one member and the receptacle is usually mounted to the other member using rivets or the like.

Heretofore various types of slip-on receptacles have been developed to facilitate the task of mounting the receptacle. Such receptacles are disclosed, for example, in U.S. Pat. Nos. 4,202,390; 3,802,033; 3,454,071; 2,101,287; 2,230,355; 2,387,257; 3,088,560; 3,123,880; 3,755,860; and French Patent No. 2,249,572.

The present invention relates to an improved receptacle of the type described which, in addition to having all the advantages of conventional slip-on receptacles has the added advantage of being relatively simple to assemble and which utilizes a minimum number of parts.

With the above in mind, it is the principal object of the present invention to provide an improved receptacle for a conventional quick acting self locking fastener stud of the spiral cam type.

A further object is to provide such a receptacle which utilizes a minimum number of components while providing a positive locking action.

Still other objects and advantages will become apparent from a review of the following description of a preferred embodiment of the present invention.

SUMMARY OF THE INVENTION

The above and other objects and advantages are attained in accordance with the present invention by providing a receptacle for a self locking fastener stud comprising a housing having a bottom, an open top and sidewalls. A pair of opposed sidewalls is provided with a lip at the top end of one wall and slot provided at the top end of the other wall. The closure for the housing comprises a pair of spaced apart faces biased toward each other to define a clip therebetween. The lower face is provided with a slot at one end and a lip at the other end to coact with the lip and slot of the housing sidewalls. A spring within the housing has a central section that forms the cross pin for engagement with the stud slot. The end sections of the spring engage the opposed sidewalls urging them outwardly (i.e. away from each other) thereby securing the engagement of the lips and slots of the closure and the opposed sidewalls.

DESCRIPTION OF THE PREFERRED EMBODIMENT

Figure 1:
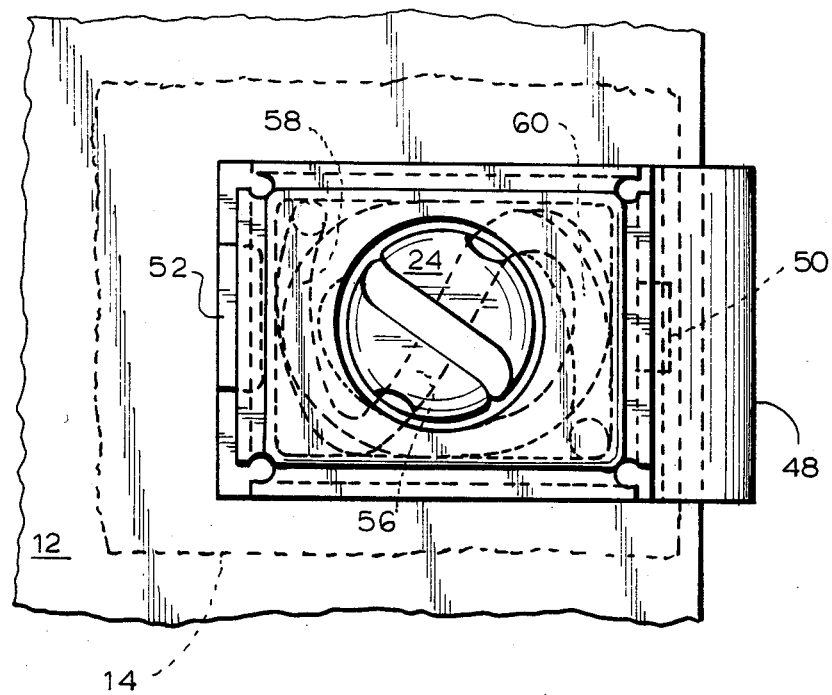
FIG. 1 is a bottom plan view of the slip on receptacle of the present invention along with an associated stud securing two members to each other.
Figure 2:
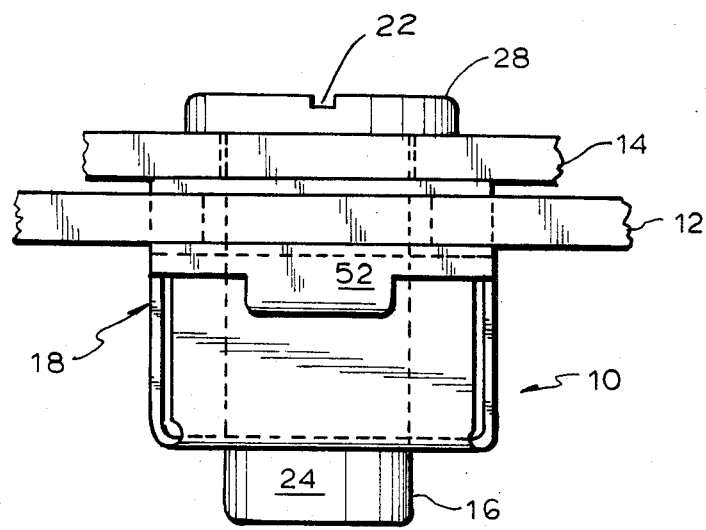
FIG. 2 is a side elevational view of the stud of FIG. 1.
Figure 3:
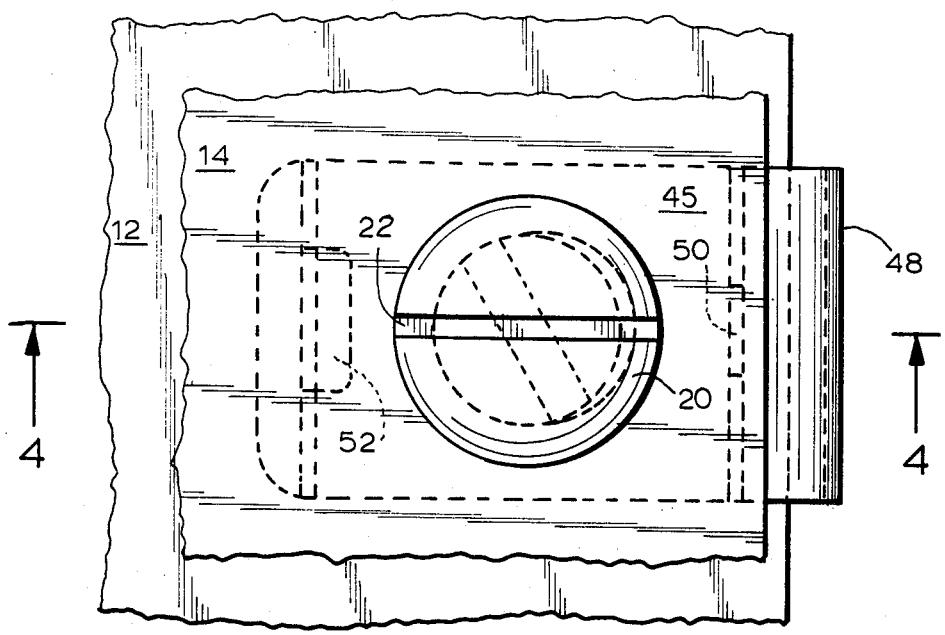
FIG. 3 is a top plan view of the stud of FIG. 1.
Figure 5:
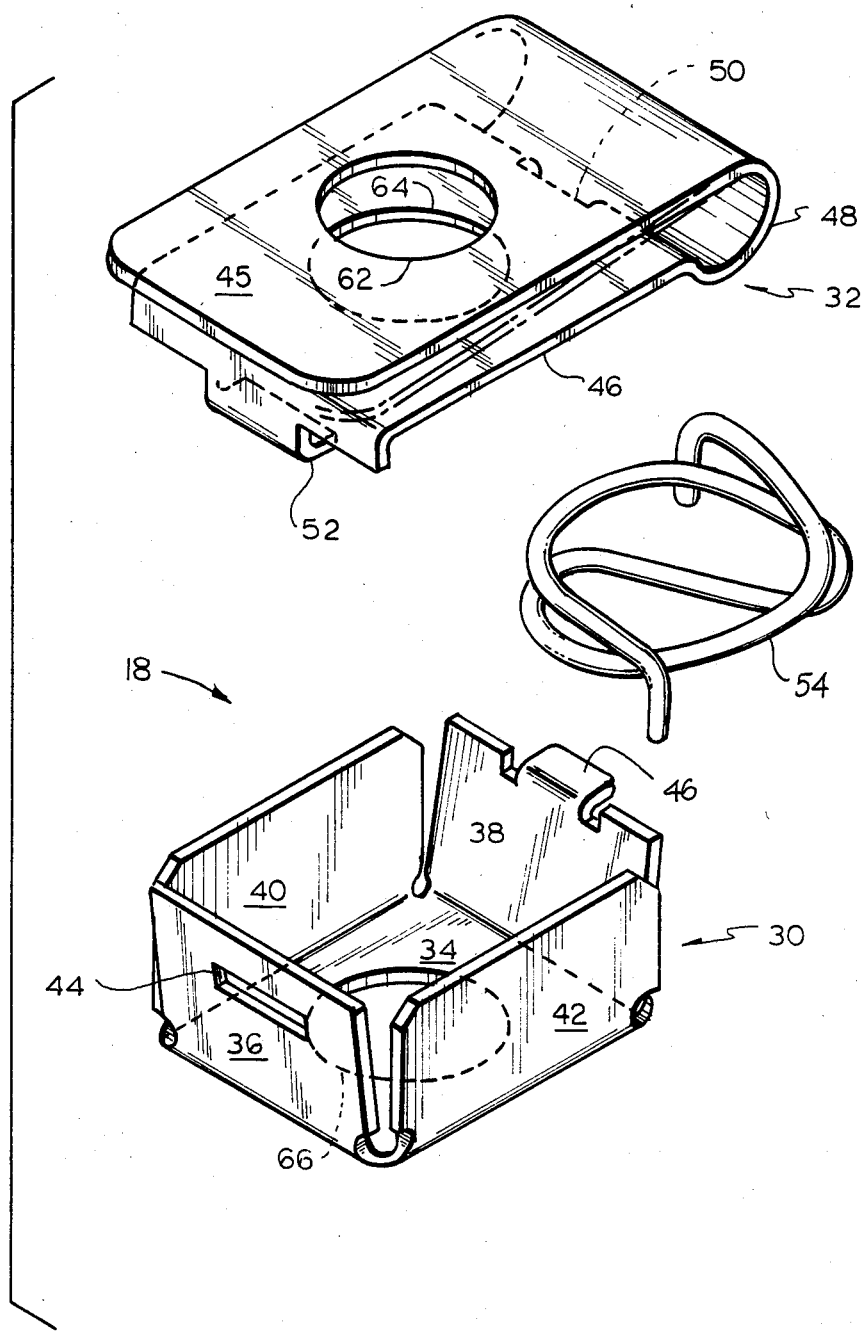

Reference is now made to the drawings and to FIGS. 1 and 2 in particular wherein a quick acting, self locking, fastener 10 is depicted securing two members, in the form of panels 12 and 14, together. The fastener 10 comprises a stud 16 and a receptacle 18. The stud 16 is of a conventional design containing an enlarged head 20 having a slot 22 therein for receiving a tool to facilitate rotation between a fastened and unfastened position. A shank portion 24 extends downwardly from the head 20. The diameter of the shank is smaller than that of the head to permit the shank to pass through a series of openings in the members to be secured and the receptacle. A spiral slot 26 is provided on shank 24. The slot 26 starts at the free end of the shank and extends to a detent 28 at the upper end of the slot. Referring to FIG. 5, it can be seen that receptacle 18 comprises a housing and closure 32. The housing includes a bottom 34, opposed sidewalls 36 and 38, and opposed end walls 40 and 42. A slot 44 is provided near the top edge of sidewall 36. A lip 46 is provided at the top of sidewall 38 defined by an outwardly turned edge.

The closure 32 comprises top and bottom faces 45, 46 formed integrally with each other as opposite sides of a generally U-section clip. A natural hinge 48 joins the top and bottom faces to each other and serves to bias the faces toward one another so as to define the clip. A slot 50 is formed at the interface of the hinge 48 and bottom face 46. The opposite end of the bottoms face includes a flange 52 bent downwardly and then inwardly so as to define a lip directed toward the slot 50.

Figure 4:
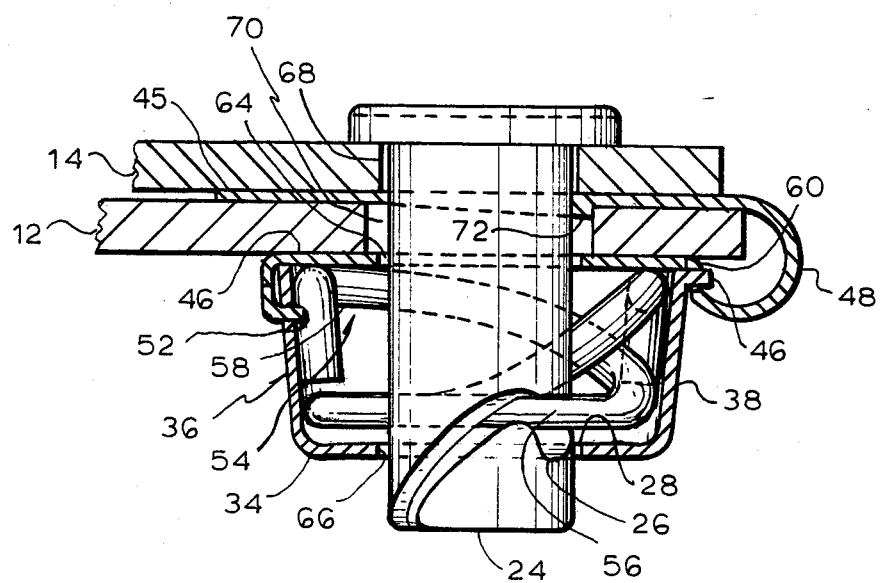
FIG. 4 is a side elevational view taken along reference lines 4—4 of FIG. 3 in the direction indicated by the arrows; and, FIG. 5 is an exploded view of the receptacle of the present invention.

When the closure 32 is positioned over housing 18 the lip 52 of the closure is captured in slot 44 of the housing sidewall and similarly the lip 46 of the opposite sidewall is captured in slot 50 of the closure. This may be best seen in FIG. 4. A coiled spring 54 is positioned within housing 30. The spring 54 includes a mid-section 56 which serves as the cross pin for engagement with the slot 26 of stud 16. That is, the spring rides along the stud slot 26 until it is captured by detent 28. The ends of spring 54 are positioned so that one end 58 engages sidewall 36 while the other end 60 engages sidewall 38. The spring thus serves to push the sidewalls apart from each other thereby locking the closure to the housing. It should be noted that aligned openings 62, 64, and 66 are provided respectively in the top face 44 and bottom face 46 of the closure as well as the bottom 34 of the housing. Similar openings 68 and 70 are provided in the panels 12 and 14 to be joined. In use, the closure 32 is positioned about the faces of panel 12. A lip 72 formed at the edge of opening 62 serves as a snap lock to prevent the closure clip from being inadvertently removed from panel 12. The housing 30 is preassembled to the closure. Stud 16 is then passed through opening 68 of the panel 14 and passed through the openings of the receptacle. The stud is then rotated causing the spring 54 to follow the spiral slot until it seats and locks in the detent. The lip 72 prevents the closure clip from rotating with the stud.

As shown in FIG. 5, each of the housing 30 and closure 32 may conveniently be formed of one piece of metal cut and bent to shape. The only other component of the receptacle is the spring 54 which serves both as the cam follower for the slotted stud and to lock the receptacle housing and closure to each other.

Thus in accordance with the above, the aforementioned objects are effectively attained.

Having thus described the invention, what is claimed is:

1. A slip-on receptacle for use with a stud having a spiral slot therein, said receptacle comprising:
   a housing having a bottom, and open top and a pair of opposed sidewalls, one of said sidewalls having at the top thereof a lip and the other of said sidewalls having at the tip thereof a slot;
   a spiral spring contained within said housing, said spring including a section for engagement within the stud slot; and,
   a closure for said housing comprising a member having top and bottom faces and means for biasing said faces towards each other to define a clip therebetween;
   the bottom face of said closure having at one end thereof a lip and at the opposite end a slot for engagement with the slot and lip of said opposed sidewalls of the housing; and
   means for biasing said opposed sidewalls apart from each other whereby to secure the engagement of the sidewalls with the closure bottom face.

2. The receptacle in accordance with claim 1 wherein one of said sidewalls has a lip and the opposed sidewall has a slot formed therein and said closure bottom face has a slot formed at the end proximal said one sidewall and a lip formed at the end proximal said opposed sidewall.

3. The receptacle in accordance with claim 1 wherein said spring includes sections on opposed sides of said slot engaging section contacting said opposed sidewalls and urging said opposed sidewalls apart.

4. The receptacle in accordance with claim 2 wherein said spring includes sections on opposite sides of said slot engaging section contacting said opposed sidewalls and urging said sidewalls apart.

5. The receptacle in accordance with claim 1 further comprising stud openings in each of said housing bottom and closure top and bottom faces, said openings being aligned with said stud engaging section of the spring.

6. The receptacle in accordance with claim 2 further comprising stud openings in each of said housing bottom and closure top and bottom faces, said openings being aligned with said stud engaging section of the spring.

7. The receptacle in accordance with claim 1 wherein said closure top and bottom faces are formed integral with each other.

8. The receptacle in accordance with claim 2 wherein said closure top and bottom are formed integral with each other.

* * * * *